Jan. 1, 1929.                                   1,697,035
R. E. WELLS
METHOD OF FORMING METAL
Filed Aug. 14, 1924
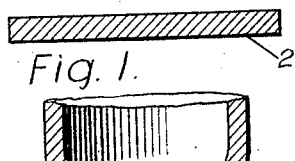
Fig. 1.
Fig. 3.
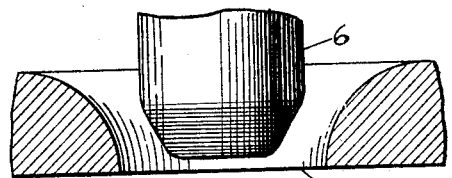
Fig. 2.
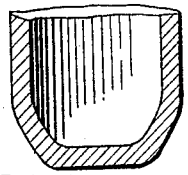
Fig. 5.
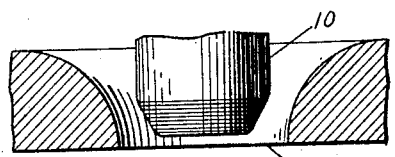
Fig. 4.
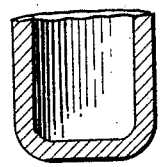
Fig. 7.
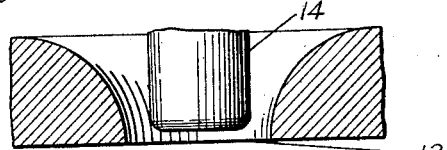
Fig. 6.
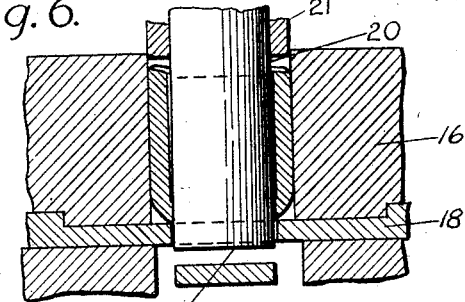
Fig. 8.
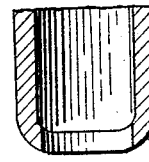
Fig. 9.
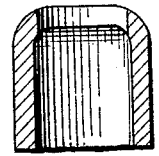
Fig. 10.
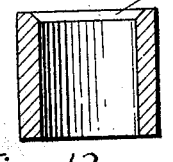
Fig. 12.
Fig. 11.
Inventor:
Reginald E. Wells,
by his Attorney.

Patented Jan. 1, 1929.

1,697,035

UNITED STATES PATENT OFFICE.

REGINALD E. WELLS, OF EAST ORANGE, NEW JERSEY, ASSIGNOR TO GENERAL MOTORS CORPORATION, OF DETROIT, MICHIGAN, A CORPORATION OF MICHIGAN.

METHOD OF FORMING METAL.

Application filed August 14, 1924. Serial No. 732,085.

This invention relates to metal forming and is herein illustrated by reference to a method and apparatus for forming sleeves or rings from flat stock.

One method of making hollow sleeves or rings is to cut a disc from sheet metal, draw the disc into the form of a deep cup, and trim the ends of the cup. In cutting off the bottom end of the cup, a piece of material greater in length than the thickness of the cup is wasted and some material is wasted in cutting off the other end of the cup. An object of the invention is to eliminate the cutting off process and avoid waste of material and decrease grinding. Accordingly, I heat the cup, punch out the bottom of the cup and square one end in a die at one operation, reheat the piece, then invert it in said die, and square the other end by the direct blow of a shouldered ram.

Another object of the invention is generally to provide an improved method and apparatus for forming sleeves and the invention further consists in the various matters hereinafter described and claimed.

Referring to the drawings, Figure 1 is a section of the work piece or disc before drawing.

Figures 2, 4, 6 and 8 are sectional views of the dies for treating the work and Figures 3, 5, 7 and 9 are sectional views of the work piece after it has been treated in said dies, respectively.

Figure 10 is a sectional view of the work piece of Figure 9, inverted.

Figure 11 is a sectional view of the die of Figure 8 with means for squaring the ends of the work piece and Figure 12 is a sectional view of the finished sleeve.

The numeral 2 indicates a work piece, of low carbon or alloy steel, in the form of a disc to be formed into a sleeve. The piece 2 is heated to approximately 1600° F. and drawn into the shape shown in Figure 3 by the die 4 and ram or plunger 6 of Figure 2. It is again heated and drawn into the shape shown in Figure 5 by the die 8 and ram 10 of Figure 4. Another heating and drawing by means of the die 12 and ram 14 of Figure 6 forms it into the shape of the deep cup shown in Figure 7. Next the cup-shaped piece, again heated, is placed in a die 16 with its end resting on the bottom plate 18 and a punch 20 is reciprocated through the cup and through a circular opening in the bottom plate to punch out the bottom of the cup. At the same operation, a stripper collar 21 on the punch flattens the upper end of the cup so that it is nearly true and smooth. To cut off the bottom end of the sleeve now formed, would involve a waste of the material included within the arc 22 of the rounded end, which is greater in length than the thickness of the material. Furthermore, an attempt to square both ends by pressure in the position of Figure 8 has been found to leave the bottom end largely unchanged in shape, due to cooling and to absorption of the force of the blow by the somewhat plastic material which prevents transmission of the blow to the rounded end. A cold piece would transmit a blow but would require excessive pressure to the detriment of the work.

In accordance with my invention, I next remove the piece from the die 16 and reheat it to approximately 1600° F. thereby making the material more plastic rather than less so, and then invert the piece in said die as shown in Figure 11. The rounded end of the sleeve which requires the most shaping now faces outwardly of the die. A cylindrical plunger or core 24 of a size to fit the inner surface of the finished sleeve is mounted to reciprocate through the sleeve and through the opening in the bottom plate 18. The cylindrical surface 26 of the outer die conforms to the outer diameter of the finished sleeve and confines said outer surface whereas the plunger or core 24 confines the inner surface. The annular surface at 28 of the bottom plate 18 supports the lower end of the sleeve when pressure is exerted on the upper end. The plunger 24 has a flaring conical surface 30 which forms a desired chamfer 32 on the inner surface of the finished sleeve and also tends to aid in squaring the upper end as by spreading out the rounded corner at 22. A shoulder or collar 34 is mounted on the plunger, preferably to have a slight sliding movement relatively to the latter, so that, when the plunger is withdrawn, the collar may stop first and act as a stripper. The collar descends with the plunger directly against the upper distorted end of the sleeve and presses the sleeve into the die and flattens or squares the ends. The blow is applied to the upper end before there is any chance for appreciable cooling and that part of the blow which is transmitted through the plastic material to the lower end of the sleeve effects a final shaping or squaring of the lower end.

Although the invention has been described by reference to specific steps and apparatus, it should be understood that, in its broader aspects, it is not necessarily limited thereto.

I claim:

The method of forming a plain cylindrical sleeve from a cup, which consists in punching out the bottom of the cup in a die and partially squaring the other end in a single operation to produce a sleeve with a rounded end, heating the sleeve to a plastic state and inverting it in the same die, confining the entire inner and outer surfaces of the sleeve against change in shape, and squaring the rounded end by pressure applied longitudinally of the sleeve, the rounded end of the sleeve receiving the pressure directly while the other end is rigidly supported and the plastic material progressively absorbing the blow and transmitting sufficient pressure to finish squaring the supported end with minimum strain on the material; substantially as described.

In testimony whereof I hereunto affix my signature.

REGINALD E. WELLS.

CERTIFICATE OF CORRECTION.

Patent No. 1,697,035.                        Granted January 1, 1929, to

REGINALD E. WELLS.

It is hereby certified that the State of Incorporation of the assignee in the above numbered patent was erroneously given as "Michigan" whereas said State should have been given as "Delaware", as shown by the records of assignments in this office; and that the said Letters Patent should be read with this correction therein that the same may conform to the record of the case in the Patent Office.

Signed and sealed this 5th day of February, A. D. 1929.

M. J. Moore, (Seal)                                      Acting Commissioner of Patents.